(12) United States Patent
Kuo

(10) Patent No.: US 9,787,498 B2
(45) Date of Patent: Oct. 10, 2017

(54) SYSTEM AND METHOD OF IDENTIFYING NETWORKED DEVICE FOR ESTABLISHING A P2P CONNECTION

(71) Applicant: Chi-Ming Kuo, Yilan County (TW)

(72) Inventor: Chi-Ming Kuo, Yilan County (TW)

(73) Assignee: THROUGHTEK CO., LTD., Taipei (TW)

( * ) Notice: Subject to any disclaimer, the term of this patent is extended or adjusted under 35 U.S.C. 154(b) by 760 days.

(21) Appl. No.: 13/950,281

(22) Filed: Jul. 25, 2013

(65) Prior Publication Data

US 2014/0310420 A1 Oct. 16, 2014

Related U.S. Application Data

(60) Provisional application No. 61/812,262, filed on Apr. 16, 2013.

(51) Int. Cl.
| | |
|---|---|
| *G06F 15/16* | (2006.01) |
| *H04L 12/46* | (2006.01) |
| *H04W 76/02* | (2009.01) |
| *H04N 5/232* | (2006.01) |
| *H04N 21/234* | (2011.01) |
| *H04N 21/258* | (2011.01) |
| *H04N 21/41* | (2011.01) |
| *H04N 21/422* | (2011.01) |
| *H04N 21/4223* | (2011.01) |
| *H04N 21/4227* | (2011.01) |

(52) U.S. Cl.
CPC ..... *H04L 12/4625* (2013.01); *H04N 5/23206* (2013.01); *H04N 21/23418* (2013.01); *H04N 21/25858* (2013.01); *H04N 21/4108* (2013.01); *H04N 21/4222* (2013.01); *H04N 21/4223* (2013.01); *H04N 21/4227* (2013.01); *H04W 76/023* (2013.01); *G09G 2370/022* (2013.01); *G09G 2370/16* (2013.01)

(58) Field of Classification Search
None
See application file for complete search history.

(56) References Cited

U.S. PATENT DOCUMENTS

| | | | | |
|---|---|---|---|---|
| 8,353,771 | B2 * | 1/2013 | Jiao | H04L 67/104 463/40 |
| 8,926,422 | B2 * | 1/2015 | Anderson | G07F 17/3209 463/16 |
| 2007/0265067 | A1 * | 11/2007 | Jiao | H04L 67/104 463/29 |
| 2009/0043889 | A1 * | 2/2009 | Gobara | H04L 29/12509 709/225 |

(Continued)

*Primary Examiner* — Joshua Joo
(74) *Attorney, Agent, or Firm* — Min-Lee Teng; Litron Patent & Trademark Office

(57) ABSTRACT

A barcode corresponding to an identification of the networked device is attached on a networked device, and the identification is associated with an IP address of the networked device in a server, wherein a terminal device captures the barcode for transmitting a connection request to the server; and the server obtains the identification code of the networked device according to the connection request, wherein the IP address of the networked device is obtained according to identification code for establishing a point to point (P2P) connection between the terminal device and the networked device.

19 Claims, 6 Drawing Sheets

(56) References Cited

U.S. PATENT DOCUMENTS

| | | | | |
|---|---|---|---|---|
| 2009/0293110 A1* | 11/2009 | Koga | ............... | G06F 21/36 726/6 |
| 2012/0287290 A1* | 11/2012 | Jain | ............... | H04L 63/18 348/207.1 |
| 2012/0306622 A1* | 12/2012 | Trinh | ............... | H04L 63/08 340/10.1 |
| 2013/0103847 A1* | 4/2013 | Brown | ............... | H04L 63/083 709/229 |
| 2013/0111043 A1* | 5/2013 | McGuire | ............... | H04L 61/256 709/228 |
| 2013/0125224 A1* | 5/2013 | Kaufman | ............... | H04L 63/18 726/7 |
| 2013/0244614 A1* | 9/2013 | Santamaria | ............... | H04L 51/04 455/411 |
| 2013/0334298 A1* | 12/2013 | Sakpal | ............... | G06F 17/30879 235/375 |
| 2014/0013100 A1* | 1/2014 | Menzel | ............... | H04N 21/43637 713/150 |
| 2014/0056293 A1* | 2/2014 | Kumar | ............... | H04L 63/0428 370/338 |
| 2014/0324950 A1* | 10/2014 | Lee | ............... | H04L 67/141 709/203 |
| 2015/0121415 A1* | 4/2015 | Lee | ............... | H04N 21/25816 725/25 |

* cited by examiner

SYSTEM AND METHOD OF IDENTIFYING NETWORKED DEVICE FOR ESTABLISHING A P2P CONNECTION

CROSS REFERENCE TO RELATED APPLICATIONS

This application claims the benefit of priority of U.S. Provisional Application No. 61/812,262, filed Apr. 16, 2013, which is incorporated by reference herein in their entirety.

BACKGROUND OF THE INVENTION

I. Field of the Invention

The present invention relates to establishing a network connection and, in particular, to establishing a P2P (Point to Point) connection.

II. Description of the Prior Art

Prior art discloses a platform for connectivity of Things through point to point network, wherein the platform has a management server, a plurality of proximal equipments and networked devices having a plurality of application program interfaces, wherein the management server and the linking server establish a P2P connection through the Internet, and the application programming interface (API) can be applied to a variety of different operating systems.

In the actual mode of operation, each of the networked devices has an identification code (ID) and automatically connects to the management server and registers the identification code (ID) of the networked device in the management server, the terminal device can make a request to the management server to provide addressing information of a linking sever for connecting to the networked device by inputting the identification code (ID) of the networked device for establishing a P2P connection between the networked device and the terminal device through an identical application programming interface (API).

While the foregoing system solves the connection problems when the number of network equipments increases, however, the number of identification codes and the complexity of the connecting process will increase as well, especially when the identification code is more than 10 digits or English characters or a combination thereof. When the users want to select a networked device to monitor some activities, the identification code of the networked device must be inputted to the proximal end equipment. Even if the proximal end equipment is a smart phone, it is complicated and cumbersome to input such a lengthy identification code (ID) to establish a connection.

SUMMARY OF THE INVENTION

One object of the present invention is to solve the slow process of establishing connections between the terminal devices and networked devices, which is caused by excessive number of digits or characters in the identification codes.

To achieve the above object, the present invention discloses a system to identify networked devices for establishing P2P connections, wherein the system comprises at least one network server, at least one networked device and at least one terminal device, wherein the server has a list of networked devices; the networked device has an identification code and a barcode corresponding to the identification code, the networked device registers its identification code to a list of networked devices in a server through Internet;

The terminal device includes an image capture unit which captures the barcode of the networked device for generating a connection request signal corresponding to the barcode, The connection request signal is transmitted through the Internet to the network server, wherein the network server identifies the networked device from the list of networked devices corresponding to the connection request signal and notifies the networked device that the terminal device is requesting to make a connection therewith, so that a communication channel can be established between the networked device and the terminal device, whereby a P2P connection can be established via the communication channel.

According to the system described above, the present invention provides a method to identify networked device for establishing a P2P connection, wherein the method comprises the steps of: (a) connecting at least one networked device to a network server through the Internet; (b) registering the identification code of the networked device to the list of networked devices of the server and setting up a barcode corresponding to the identification code on the networked device; (c) capturing the barcode of the networked device by an image capture unit of the terminal device to capture the barcode to produce a connection request signal corresponding to the barcode; (d) identifying, by the network server, the networked device from the list of networked devices corresponding to the connection request signal and notify the networked device that the terminal device is requesting to make a connection therewith, so that a communication channel can be established between the networked device and the terminal device, whereby a P2P connection can be established via the communication channel.

In one embodiment of the method described above, the step (c) further comprises the sub-steps of: (c1) interpreting the barcode image to an identification code; (c2) embedding the identification code in the connection request signal.

In one embodiment of the method described above, in order to avoid the interception of the identification code by unauthorized individuals, step (c) further comprises the sub-steps of (c1) embedding the connection barcode image in the connection request signal; (c2) transmitting the connection request signal to the server through the Internet, wherein step (d) further comprises the sub-steps: (d1) receiving the connection request signal; (d2) interpret the barcode image to an identification code by an image interpreting unit of the server.

Furthermore, in order to avoid unauthorized use of the terminal device to monitor by the networked devices, the step (d) further comprises the following steps: (e) input a security code through the terminal device; (f) determine whether the security password is the same as a default security password in the networked device, if not, then back to step (e), and if so, allow the terminal device to log on to the networked device.

In another embodiment in accordance with the present invention, the network server to perform holes punching to establish a communication channel between a terminal device and a networked device. In another embodiment of the present invention, the Internet is based on Ethernet (Ethernet), local area network (LAN), wide area network (WAN) and virtual private network (VPN) group consisting of any kind.

In another embodiment of the present invention, connection barcode image should be matched with the default password, and the image capture unit captures the barcode of the networked device to produce a connection request signal corresponding to the barcode.

In another embodiment of the present invention, the terminal includes an image interpreting unit to interpret the barcode image into an identification code and a default password, and the connection request signal carries the identification code and the default password.

In another embodiment of the present invention, the connection request signal carries the connection barcode image, and the server includes an image interpreting unit to interpret the barcode image into the identification code and the default password.

In another embodiment of the present invention, the connection barcode is a QR code or one-dimensional barcode. With the above technical solution, the present invention has the following advantages: It can quickly establish connections between mobile devices and networked devices. Unlike prior art to manually enter the identification code word by word, the image capture unit of a mobile phone captures the barcode image of the networked device, the barcode image is then converted into the identification code so as to allow the server to establish a P2P connection between the networked device and the terminal device.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DETAILED DESCRIPTION OF THE INVENTION

Embodiment 1

The present invention provides a system to identify a networked device for establishing a P2P connection.

In one embodiment, the system to identify a networked device for establishing a P2P connection, the system comprising: a network server having a list of networked devices; a networked device, wherein the networked device has an identification code, wherein the networked device registers the identification code into the list of networked devices by connecting to the network server through the Internet; an image pattern comprising information of the identification code; and a terminal device, wherein the terminal device generates a connection request signal when the image pattern is captured to the terminal device; and the terminal device transmits the connection request signal to the network server through the Internet, wherein the network server identifies the networked device in the list of the networked devices according to the connection request signal so as to establish a P2P connection between the terminal device and the networked device.

Figure 1:
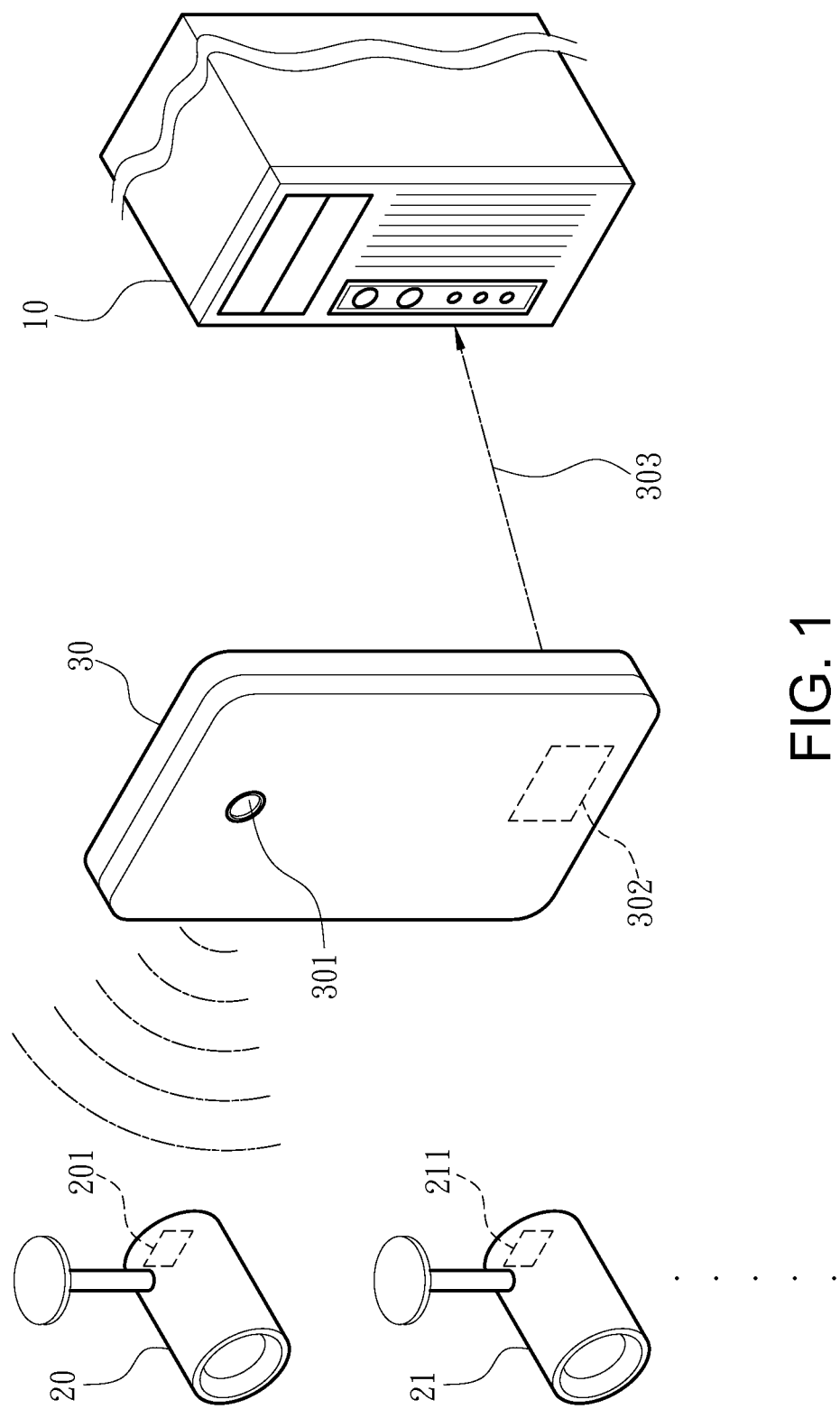
FIG. 1 illustrates a schematic of a system to identify a networked device for establishing a P2P connection according to one embodiment of the present invention.
Figure 2:
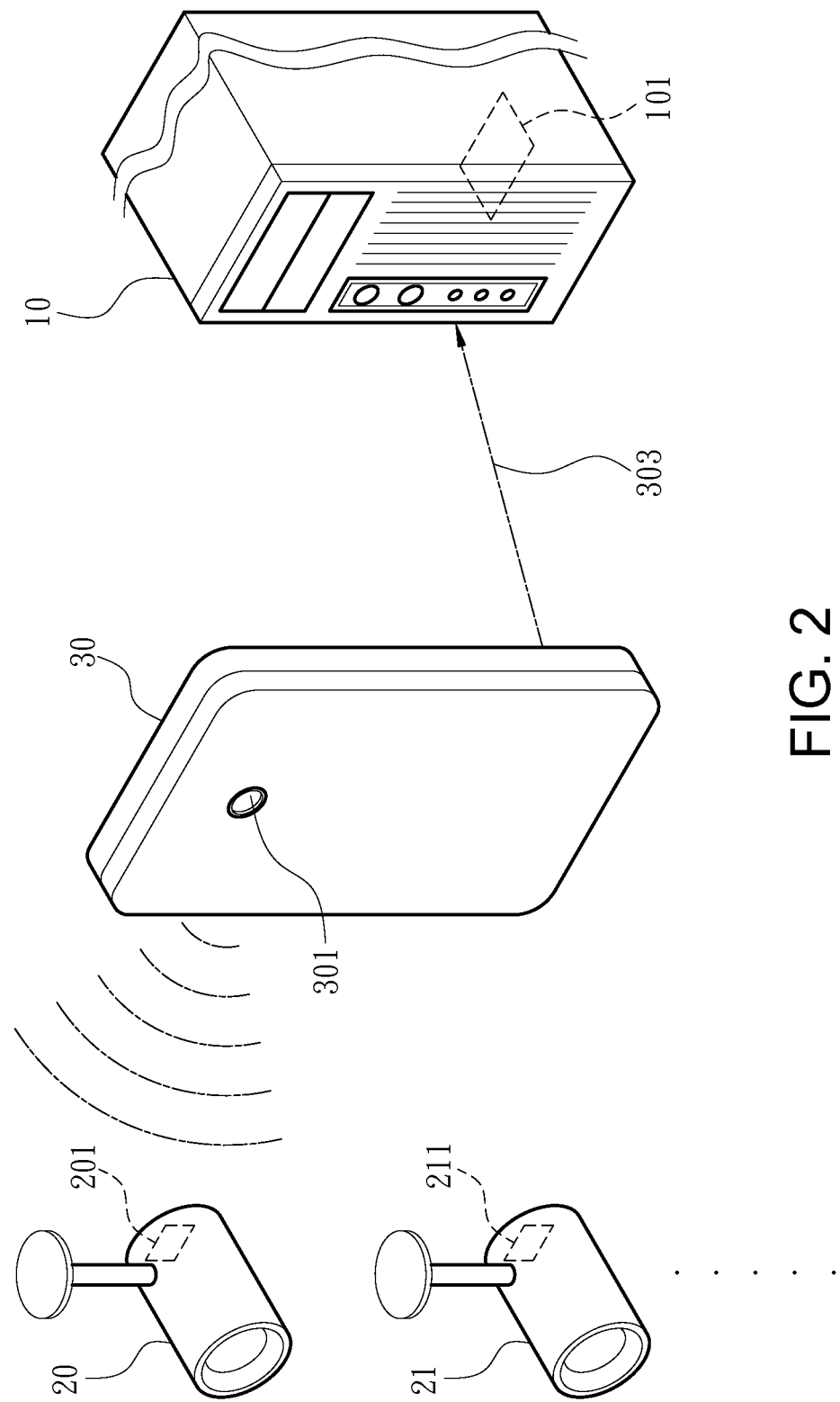
FIG. 2 illustrates a schematic of a system to identify a networked device for establishing a P2P connection according to one embodiment of the present invention.

Please refer to FIG. 1 to FIG. 2, which illustrates a schematic of a system to identify a networked device for establishing a P2P connection, wherein the system includes a network server 10, a first networked device 20, a second networked device 21 and a terminal device 30, wherein the terminal device 30 can be portable electronic devices such as mobile phones, tablet computers, notebook computers equipped with cameras, but not limit to; and the first and second networked device can be a webcam, a network surveillance camera or a network monitor, but not limit to.

In this embodiment, the terminal device 30 is a cell phone, and each of the first and second networked devices 20, 21 is a webcam. The first networked devices 20 and 21 have a built-in identification code A and B respectively, and the first, second networked devices 20, 21 connect to the network server 10 through the Internet, wherein the Internet can be based on Ethernet, wireless networks, local area network (LAN), wide area network (WAN) or virtual private network (VPN).

Alternatively, if the first, second networked device 20, 21 is a network camera installed in a house, the first and second networked device can use a power line to connect to a network server 10 through a router and a bridge to bridge the power line to the router. That is, the first and second networked devices 20, 21 can be connected to network server 10 through the power line. As the power line transmission technology is not the focus of current invention and is well known in the art, it is not described herein further. The first and second networked devices 20, 21 connect to the network server 10 through the Internet, and register identification codes A, B and their network addresses respectively in a list of networked devices of the network server 10.

One key focus of the present invention is that the first and second networked device 20, 21 is respectively equipped with a first connection barcode 201 and a second connection barcode 211, the first and second connection bar 201, 211 are respectively stored with information of the first and the second identification codes A, B. Each of the first and second connection barcodes 201 211 is a two-dimensional code such as a quick response code (QR code), however, it is not limited to that and it can be in other form such as a one-dimensional barcode.

In order to interpret the first and second connection barcode 201, 211, two embodiments are disclosed as follows. Please refer to FIG. 1, in one embodiment, the terminal device 30 includes an application program interface (API) and an image capture unit 301 preferably a camera. If the user decides to connect the terminal device 30 to the first networked device 20, she/he can operate the application program interface (API) to enable the image capture unit 301 to capture the image of the connection barcode 201 on the first networked device 20 to produce a connection barcode image, and then convert the captured barcode image to a first identification code A by an interpretation unit 302, then the terminal device 30 generates a first connection request signal 303 comprising the identification code A, and the application programming interface (API) transfers the connection request signal 303 to the network server 10 through a wireless device of the terminal device 30.

However, after taking into consideration that the decoded first identification code can be intercepted by unauthorized individuals during transmission in the wireless network, a second embodiment of the present invention is also disclosed. Please refer to FIG. 2, in one embodiment, the terminal device 30 includes an application program interface (API) and an image capture unit 301. If a user decides to connect the terminal device 30 to the first networked device 20, she/he can operate the application program interface (API) to enable the image capture unit 301 to capture the first connection bar 201 to produce a connection barcode image, however, in this embodiment, the connection barcode image will not be interpreted in the terminal device 30, therefore, the terminal device 30 sends a connection request signal 303 containing the connection barcode image instead of the identification code of the first networked device 20. The application programming interface (API) transfers the connection request signal 303 to the network server 10 through a wireless device of the terminal device 30.

As the first connection barcode 201 can be a QR code, the QR code can be kept in its original form and carried in the connection request signal 303 and transmitted to the network server 10 through a wireless network. Thus, the security can be enhanced as an extra interpretation procedure of the QR code is necessary for those unauthorized individuals. Accordingly, in order to interpret the first connection bar 201 carried in the connection request signal 303, the network server 10 is equipped with a barcode interpretation unit 101 for converting the first connection barcode 201 to the first identification code A.

Figure 3:
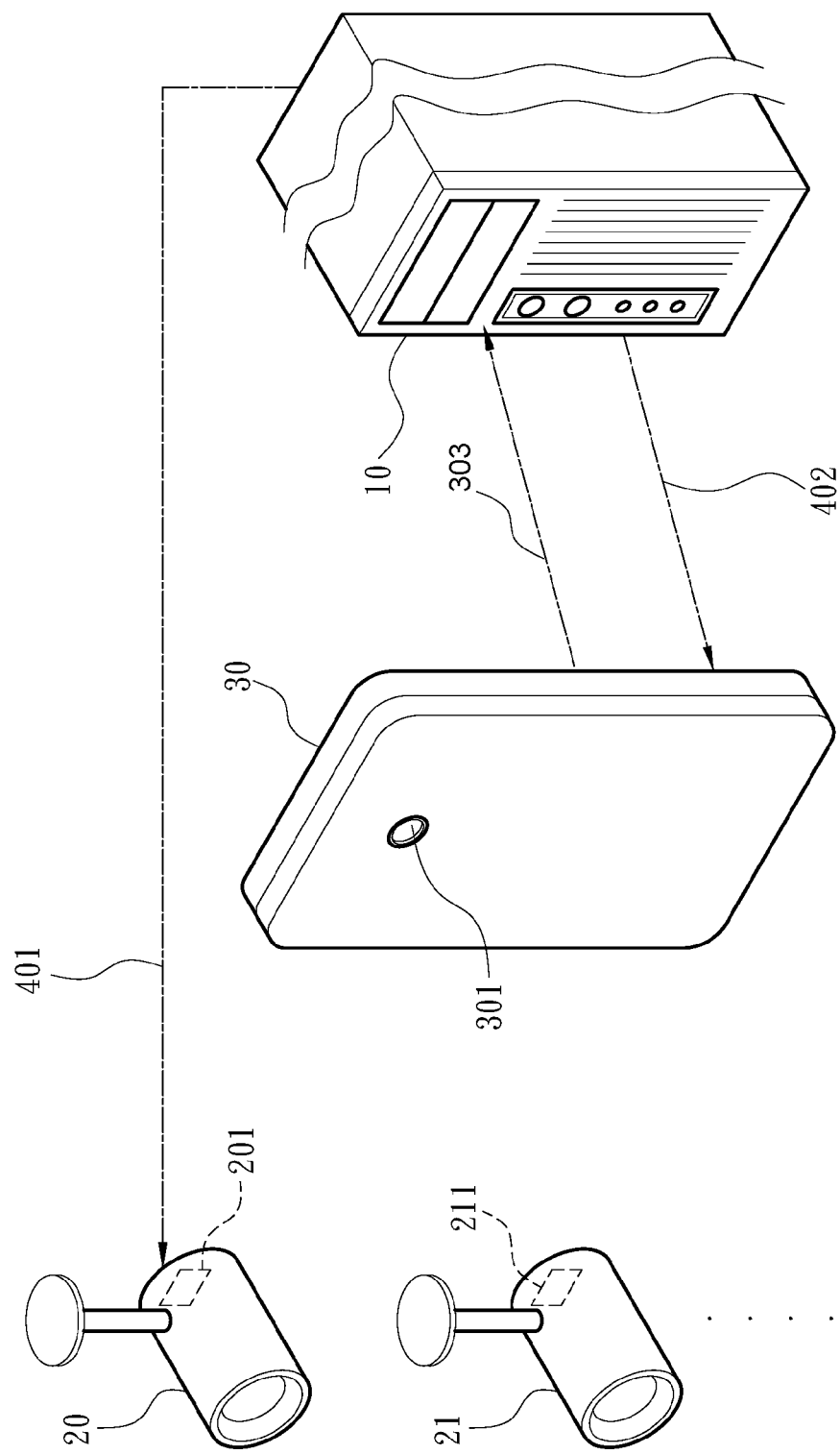
FIG. 3 illustrates a schematic of transmission hole-punching messages to establish a P2P connection.
Figure 4:
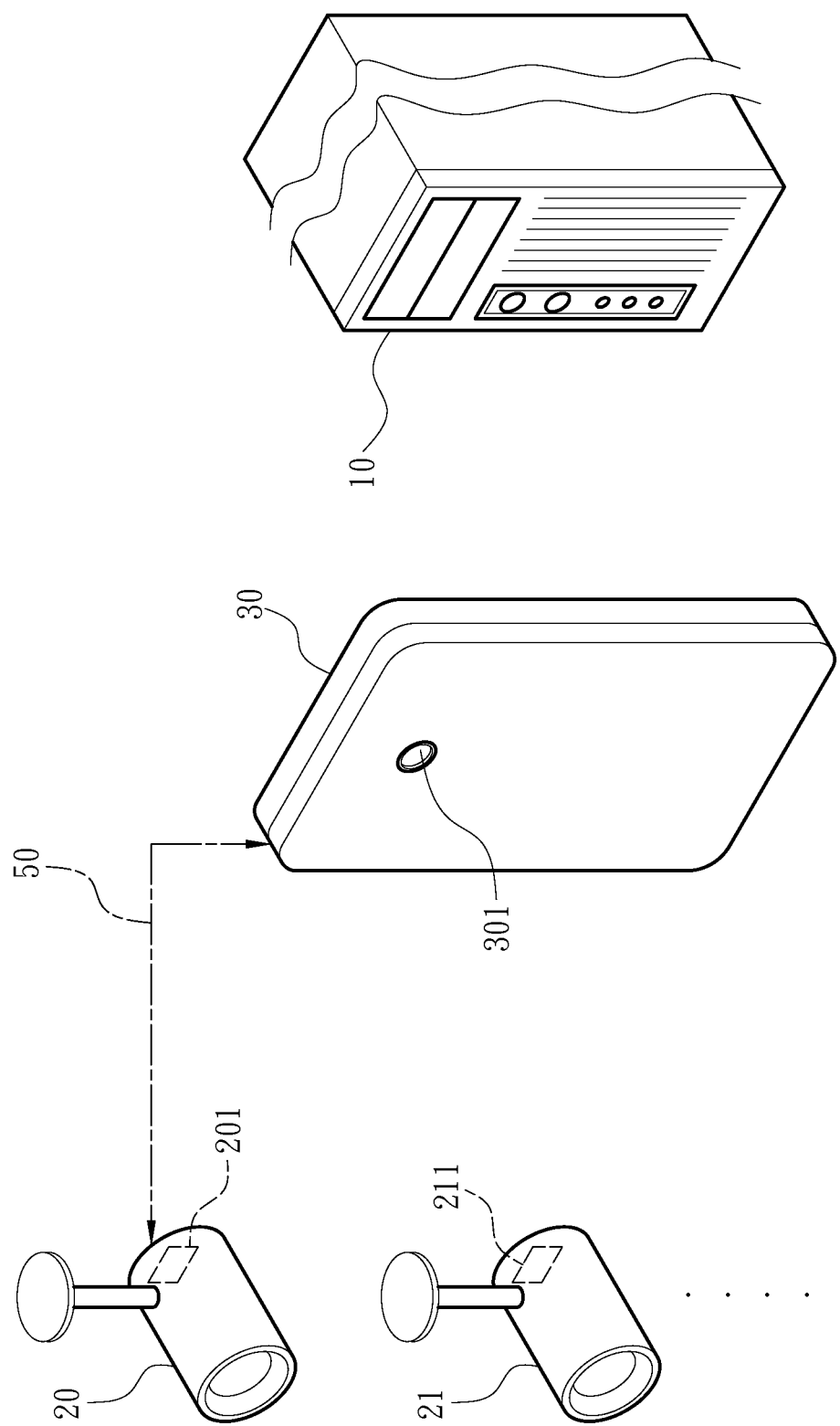
FIG. 4 depicts a schematic of a P2P connection.

Please refer to FIG. 3 which illustrates a schematic of transmitting messages for punching holes to establish a P2P connection. As shown in FIG. 3, when the network server 10 receives the connection request signal 303, the first identification code A can be obtained by analyzing the connection request signal 303 no matter if the interpretation of the barcode image is done in the terminal device 30 or in the network server 10, As a result, the network server 10 can search for the network address of the networked device in the list of the networked devices corresponding to the first identification code, in this embodiment, the first identification code is just the same as the built-in identification code of the first networked device, Therefore, when the network server 10 receives the connection request signal 303, it will notify the first networked device 20 that the terminal device 30 is making a request to connect therewith, according to the network address of the networked device corresponding to the first identification code. Through hole-punching technique, which is well known in the field, the server 10 respectively transmits hole-punching messages 401, 402 to the first networked device 20 and the terminal device 30 respectively. At this time, as shown in FIG. 4, a direct communication passage 50 is established between the first networked device 20 and the terminal device 30; and a P2P connection is then established between the first networked device 20 and the terminal device 30 via the direct communication passage 50.

Furthermore, the first networked device 20 has a default security password which can be set by a user. If a user tries to use the terminal device 30 to log on the first networked device 20, the user inputs to the terminal device 30 a security password and the application programming interface (API) then send the security password to the first networked device 20 through the internet. Only when the input security password matches the default security code, will the terminal equipment 30 be authorized to connect to the first networked devices 20 to exchange data.

In order to avoid manually entering the default security password, the first connection barcode 201 can carry the identification code as well as the security password. By doing so, when the image capture unit 301 captures the first barcode of the first networked device 20 to produce a first connection barcode image, the barcode image interpretation units 101, 302 convert the first connection barcode image into the identification code and the security password. When the terminal device 30 is connected to the networked devices 20, it will be authorized to exchange data with the networked devices 20 at the same time.

In another embodiment, the application programming interface (API) of the terminal device 30 can convert the identification code and default security password into a connection barcode, which can be stored for establishing a P2P connection with the first networked device 20 to exchange data, next time.

In one embodiment, after the terminal device 30 converts the identification code and default security password into a connection barcode, the terminal device 30 can transmit the connection barcode to other terminal devices to enable them to establish a P2P connection with the first networked devices 20 to exchange data as well.

Figure 5:
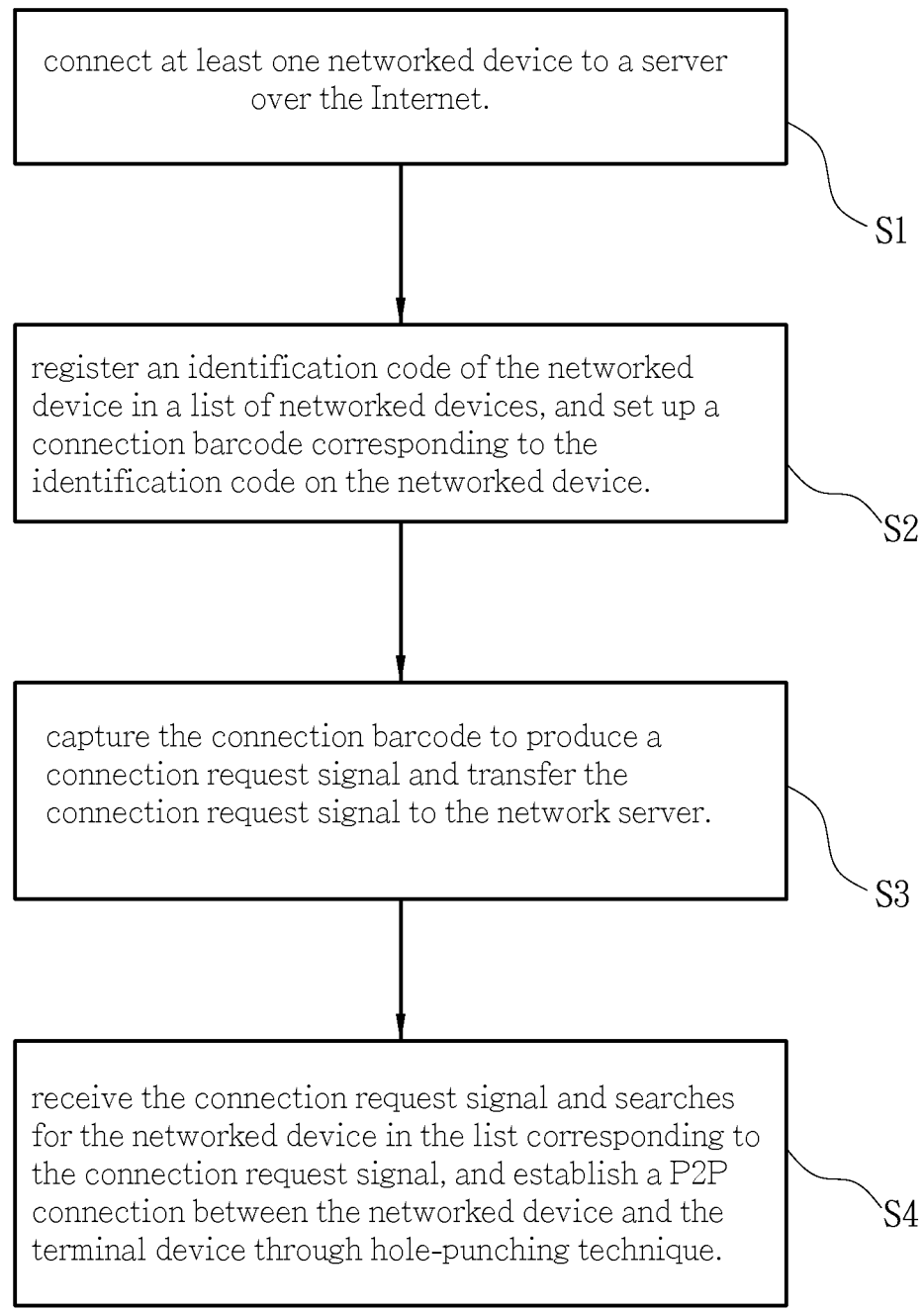
FIG. 5 depicts a flowchart of establishing a P2P connection.

Please refer to FIG. 5 which depicts a flowchart of establishing a P2P connection between the terminal devices and networked devices. As shown FIG. 5, firstly, connect at least one networked device to a server over the Internet (step S1). Then, the server registers an identification code and a network address of the networked device in a list of networked devices, and sets up a connection barcode corresponding to the identification code on the networked device (step S2), and Then, the terminal device 30 captures the connection barcode to produce a connection request signal 303 and transfers the connection request signal 303 to the network server 10 through a wireless device of the terminal device 30 (step S3), the network server 10 receives the connection request signal and searches for the networked device in the list of the networked devices according to the connection request signal, and notify the first networked device 20 that the terminal device 30 is making a request to connect therewith. Through hole-punching technique, a communication channel between the networked device and the terminal device is established for establishing a P2P connection between the networked device and the terminal device (step S4).

In one embodiment, the terminal device 30 is a cell phone, and the first and second networked devices 20, 21 can be storage equipment, such as portable hard drive, portable solid state disk, redundant disk array, etc.

Embodiment 2

The embodiment 2 of present invention provides a system to identify a networked device for establishing P2P connection.

Please refer to FIG. 1 to FIG. 2, which illustrates a schematic of a system to identify a networked device for establishing a P2P connection, wherein the system includes a network server 10, a first networked device 20, a second networked device 21 and a terminal device 30, the terminal device 30 can be a storage device such as a portable hard drive, a portable solid state disk, a remote control, a power extension cord, which does not have a camera or lens to capture images.

The first and second networked device can be a mobile phone, a PAD, a notebook, a webcam, a network surveillance camera or one network monitor, but not limit to. In this embodiment, a terminal device 30 is a portable hard drive, (Please note that terminal device 30 is now referring to a portable hard drive instead of a mobile phone and the image capture unit 301 in FIG. 1 should be removed, for the descriptions in Embodiment 21, and the first and second networked devices 20, 21 respectively a webcam, wherein a proxy mobile phone (Not shown in FIG. 1) has an image capture unit to capture the barcode image of the first networked device 20 to produce a connection barcode and transmits to the terminal device 30, and an interpreting unit 302 of the terminal device 30 converts the connection barcode into the first identification code A, wherein the proxy mobile phone can transfer information to the terminal equipment through many ways such as wireless or wired lines.

In another embodiment, the proxy mobile phone has a video capture unit to capture the barcode image of the first networked device 20 to produce a connection barcode image; and an interpreting unit to convert the connection barcode into the first identification code A and transmit the first identification code A to the terminal device 30.

In another embodiment the connection code image is not interpreted in the terminal device 30 and the mobile phone, therefore, the terminal device 30 embeds the connection code image in the connection request signal 303 which is transmitted to the network server 10 through a wireless network via an application programming interface (API) of the terminal device 30.

Furthermore, the first networked device 20 includes a default security password which can be set by a user, if a user tries to use the terminal device 30 to log on the first networked device 20, the user inputs a security password to the proxy mobile phone and the proxy mobile phone transmits a security password to the terminal device 30. The application programming interface (API) of the terminal device 30 then sends the security code to the first networked device 20 through the internet; only when the input security password matches the default security code, will the terminal equipment 30 obtain the authorization to connect to the first networked devices 20 to exchange data. In order to avoid manually entering the default security password, the first connection barcode 201 can carry the identification code as well as the security password.

When the proxy mobile phone video interception unit captures first connection bar 201 of the first networked device 20 to generate a connection barcode image, an image interpretation unit converts the connection barcode image into the identification code with the default security code, so that a P2P connection can be established between the terminal device 30 and the first networked device 20, and at the same time the terminal device 30 is authorized to exchange data with the first networked device 20, wherein the connection barcode image can be interpreted by an interpreting unit in the terminal device 30, the proxy mobile phone. Alternatively, the terminal device 30 sends the connection request signal 303 to the server 10 in which the connection barcode image can be interpreted.

Other descriptions are the same as in Embodiment 1 described above. In this Embodiment 2, a proxy device, such as a mobile phone, is used to generate an image of a pattern, such as a one dimensional Barcode or a QR code, for inputting identification information for a terminal equipment, so that the terminal equipment, which has no image sensing capability or inputting capability for inputting a series of words, characters, symbols or digits by a user, can establish a P2P connection with other terminal equipments.

Please note that the proxy device such as a mobile phone can input identification information for terminal equipment through an input device such as a keyboard, touch screen, etc. In other words, it is not necessary for the proxy device to have image sensing capability.

The terminal equipment can be any device such as a remote control or a power control device such as a power extension code, a lamp, a water supply and etc., which has no imaging sensing or inputting capability for inputting identification information to establish a P2P connection with other terminal equipments. Likewise, the proxy device can be any device, such as a camera, a notebook, a PAD, etc., which has imaging sensing or inputting capability for inputting identification information in order to allow the terminal equipment to establish a P2P connection with other terminal equipments. Furthermore, the proxy device can transfer information to the terminal equipment through many ways such as wireless or wired lines.

The portable hard drive can be used for sharing information for all the connected devices, such as a mobile phone, an IP camera, a notebook, etc., by establishing P2P connections between the portable hard drive and all the connected devices.

Figure 6:
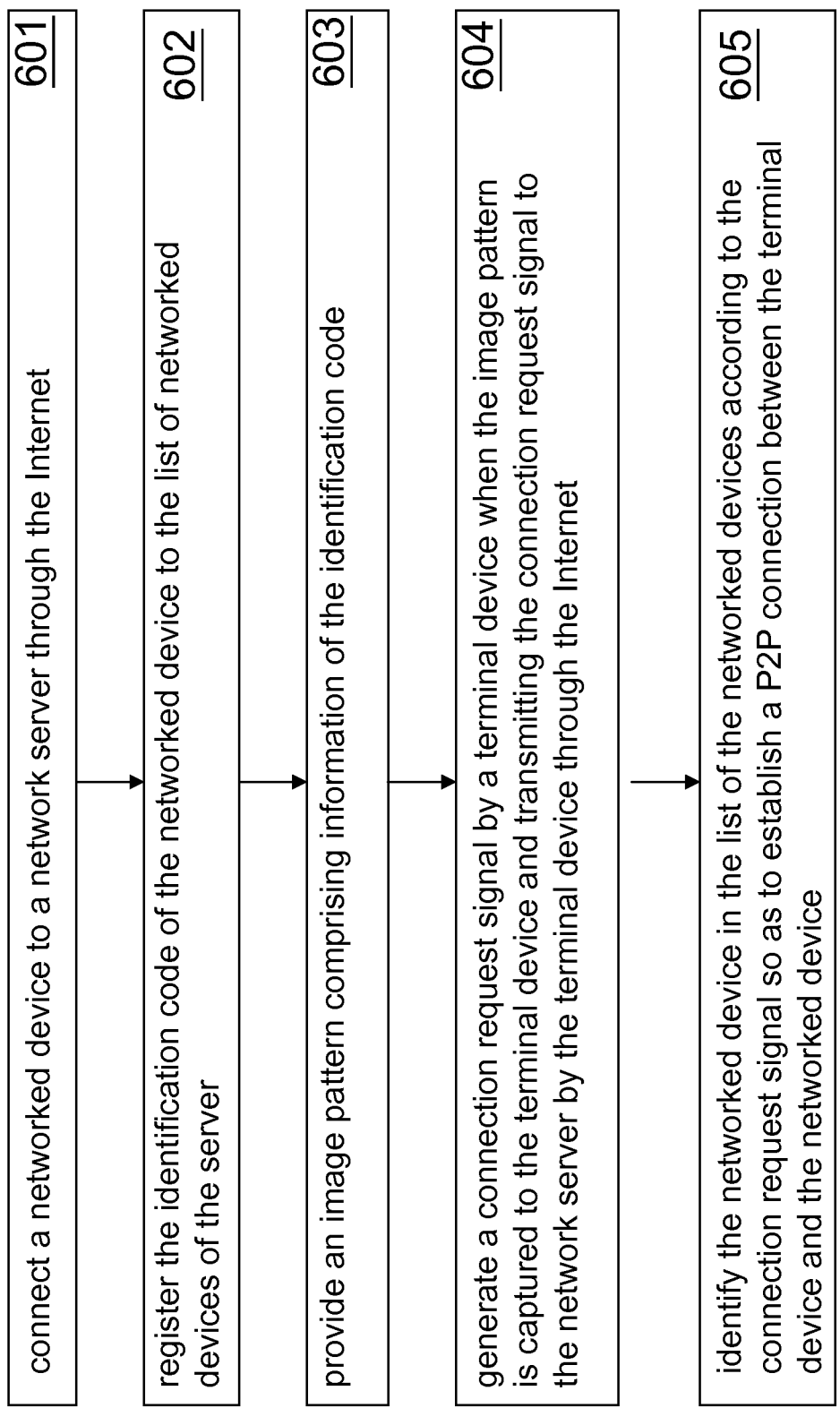
FIG. 6 depicts a flowchart to identify networked device for establishing a P2P connection.

In one embodiment, FIG. 6 depicts a flowchart to identify networked device for establishing a P2P connection. Firstly, connect a networked device to a network server through the Internet (step 601). Then, register the identification code of the networked device to the list of networked devices of the server (step 602). In step 603, provide an image pattern comprising information of the identification code. In step 604, generate a connection request signal by a terminal device when the image pattern is captured to the terminal device and transmitting the connection request signal to the network server by the terminal device through the Internet. In step 605, identify the networked device in the list of the networked devices according to the connection request signal so as to establish a P2P connection between the terminal device and the networked device.

In summary, a connection barcode is attached to a networked device corresponding to an identification code of the networked device, the connection barcode can be scanned by an image capture unit, in the terminal device or an external device, to capture the connection barcode, and the captured connection barcode image can be interpreted in the terminal device, the external device or on the network server to obtain the identification code of the networked device, whereby a P2P connection can be established between the terminal device and the networked device quickly.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. A system to identify a networked device for establishing a point-to point (P2P) connection, the system comprising:
   a network server having a list of networked devices that are pre-registered in the network server, wherein the network server associates a corresponding identification of each networked device with a corresponding IP address of the networked device for enabling terminal devices to establish P2P connections with the plurality of networked devices;

a first networked monitoring device, having a first identification embedded in the first networked monitoring device, wherein the first networked monitoring device registers the embedded first identification into the list of networked devices to associate a corresponding IP address of the first networked monitoring device with the first identification by connecting to the network server through the Internet;

an image pattern, being attached on the first networked monitoring device and comprising the first identification for establishing a P2P connection with the first networked monitoring device; and a terminal device, wherein the terminal device generates a connection request signal when the image pattern is captured to the terminal device; and the terminal device transmits the connection request signal to the network server through the Internet, wherein the network server obtains the first identification according to the connection request signal and obtains the corresponding IP address of the first networked monitoring device according to the obtained first identification for establishing a P2P connection between the terminal device and the first networked monitoring device, wherein the network server respectively transmits hole-punching messages to the terminal device and the first networked monitoring device via the Internet to establish the P2P connection, and wherein the first networked monitoring device does not capture any image pattern associated with the terminal device for establishing the P2P connection between the terminal device and the first networked monitoring device.

2. The system according to claim 1, wherein the image pattern is a barcode, wherein a barcode image is generated in the terminal device.

3. The system according to claim 2, wherein the terminal device converts the barcode image into the first identification, wherein the connection request signal comprises the first identification.

4. The system according to claim 2, wherein the connection request signal comprises the barcode image and the network server converts the barcode image into the first identification.

5. The system according to claim 1, wherein the network server establishes a communication channel between the terminal device and the first networked monitoring device through a hole-punching technique, for establishing the P2P connection.

6. The system according to claim 2, wherein the first networked monitoring device includes a default security password and the terminal device enters the default security password to log on the first networked monitoring device.

7. The system according to claim 6, wherein an image capture unit of the terminal device captures the barcode to generate the barcode image, wherein the barcode image comprises the default security password.

8. The system according to claim 7, wherein the terminal device converts the barcode image into the first identification and the default security password, wherein the connection request signal comprises the first identification and the default security password.

9. The system according to claim 7, wherein the connection request signal comprises the barcode image, wherein the network server converts the barcode image into the first identification and the default security password.

10. The system according to claim 2, wherein the barcode is a quick response code (QR code).

11. The system according to claim 2, wherein the barcode is a one dimensional barcode.

12. A method to identify networked device for establishing a point-to point (P2P) connection, the method comprising the steps of:

(a) connecting a first networked monitoring device to a network server through the Internet, wherein the network server has a list of networked devices that are pre-registered in the network server, wherein the network server associates a corresponding identification of each networked device with a corresponding IP address of the networked device for enabling terminal devices to establish P2P connections with the plurality of networked devices;

(b) registering a first identification of the first networked monitoring device into the list of networked devices of the server;

(c) providing an image pattern comprising the first identification, wherein the image pattern is attached on the first networked monitoring device for establishing a P2P connection with the first networked monitoring device;

(d) generating a connection request signal by a terminal device when the image pattern is captured to the terminal device and transmitting the connection request signal to the network server by the terminal device through the Internet; and (e) identifying the first networked monitoring device in the list of the networked devices of the network server to obtain the first identification according to the connection request signal and obtain the corresponding IP address of the first networked monitoring device according to the obtained first identification for establishing a P2P connection between the terminal device and the first networked monitoring device, wherein the network server respectively transmits hole-punching messages to the terminal device and the first networked monitoring device via the Internet to establish the P2P connection, and wherein the first networked monitoring device does not capture any image pattern associated with the terminal device for establishing the P2P connection between the terminal device and the first networked monitoring device.

13. The method according to claim 12, wherein the image pattern is a barcode, wherein an image capture unit of the terminal device captures the barcode to generate a barcode image.

14. The method according to claim 13, wherein the step (d) further comprises the sub-steps of: (d1) interpret the barcode image to the first identification by an image interpreting unit of the terminal device; (d2) embed the first identification in the connection request signal.

15. The method according to claim 13, wherein the step (d) further comprises (d1) embedding the barcode image in the connection request signal; (d2) transmitting the connection request signal to the network server through the Internet.

16. The method according to claim 15, wherein the step (e) further comprises the sub-steps: (e1) receiving the connection request signal; (e2) interpreting the barcode image to the first identification by an image interpreting unit of the server.

17. The method according to claim 13, wherein the step (e) comprises the steps of: (f) inputting a security password through the terminal device; (g) determining whether the security password is the same as a default security password in the first networked monitoring device, if not, then back to step (f), and if so, allow the terminal device to log on the first networked monitoring device.

18. The method according to claim 13, wherein the barcode is a quick response code (QR code).

19. The method according to claim 13, wherein the barcode is a one dimensional barcode.

\* \* \* \* \*